US006888965B1

(12) United States Patent
Räth et al.

(10) Patent No.: US 6,888,965 B1
(45) Date of Patent: May 3, 2005

(54) METHOD AND DEVICE FOR SEGMENTING A POINT DISTRIBUTION

(75) Inventors: Christoph Räth, München (DE); Gregor Morfill, München (DE)

(73) Assignee: Max-Planck-Gesellschaft zur Forderung der Wissenschaften e.V. (DE)

( * ) Notice: Subject to any disclaimer, the term of this patent is extended or adjusted under 35 U.S.C. 154(b) by 0 days.

(21) Appl. No.: 10/019,819

(22) PCT Filed: May 24, 2000

(86) PCT No.: PCT/EP00/04739

§ 371 (c)(1),
(2), (4) Date: Jan. 29, 2002

(87) PCT Pub. No.: WO00/79471

PCT Pub. Date: Dec. 28, 2000

(30) Foreign Application Priority Data

Jun. 21, 1999 (DE) ......................... 199 28 231

(51) Int. Cl.⁷ .................... G06K 9/34; G06K 9/46
(52) U.S. Cl. .................... 382/173; 382/190
(58) Field of Search ................. 382/128, 132, 382/162, 165, 170, 173, 181, 190, 195, 197, 224, 228, 260, 276, 298; 345/582, 586, 606

(56) References Cited

U.S. PATENT DOCUMENTS

| | | | | |
|---|---|---|---|---|
| 5,577,131 A | * | 11/1996 | Oddou ..................... | 382/173 |
| 5,822,466 A | * | 10/1998 | Morfill et al. ............ | 382/260 |
| 5,825,909 A | * | 10/1998 | Jang ........................ | 382/132 |
| 5,923,780 A | * | 7/1999 | Morfill et al. ............ | 382/195 |
| 6,192,150 B1 | * | 2/2001 | Leow et al. .............. | 382/190 |
| 6,396,952 B1 | * | 5/2002 | Horikawa et al. ........ | 382/203 |
| 6,516,093 B1 | * | 2/2003 | Pardas et al. ............. | 382/243 |
| 6,625,333 B1 | * | 9/2003 | Wang et al. .............. | 382/300 |
| 6,693,962 B1 | * | 2/2004 | Murching et al. ...... | 375/240.11 |
| 6,803,919 B1 | * | 10/2004 | Kim et al. ................. | 345/582 |
| 6,813,379 B2 | * | 11/2004 | Kawada et al. .......... | 382/173 |

FOREIGN PATENT DOCUMENTS

| | | | |
|---|---|---|---|
| DE | 43 17 746 A1 | 12/1984 | ............. 382/260 |
| DE | 196 33 693 C1 | 11/1997 | ............. 382/195 |

OTHER PUBLICATIONS

M. Tuceryan et al., Handbook of Pattern Recognition and Computer Vision, "Texture Analysis", World Scientific, Publishing, 1993, pp 235–276.

R. C. Dubes, Handbook of Pattern Recognition and Computer Vision, "Cluster Analysis and Related Issues", World Scientific Publishing, 1993, pp 3–32.

(Continued)

Primary Examiner—Andrew W. Johns
Assistant Examiner—Amir Alavi
(74) Attorney, Agent, or Firm—DLA Piper Rudnick Gray Cary US LLP

(57) ABSTRACT

In order to segment a distribution of points into partial areas with predetermined structural elements, a feature vector ($\vec{x}_i$) whose components are determined based on several scaling factors is ascertained for each point ($\vec{p}_i$); the accompanying feature vectors ($\vec{p}_i'$) are determined for a predetermined number of reference points ($\vec{p}_i'$) for which the respective allocation to one of the structural elements is given, and texture classes each corresponding to the underlying structural elements are formed out of the feature vectors of the reference points; a distance to each of the texture classes is determined for all remaining points ($\vec{p}_i''$) of the point distribution that are not reference points ($\vec{p}_i''$); and the partial areas of the segmentation are formed out of the reference points respectively belonging to a texture class and the allocated points.

11 Claims, 11 Drawing Sheets

OTHER PUBLICATIONS

Figure 1A:
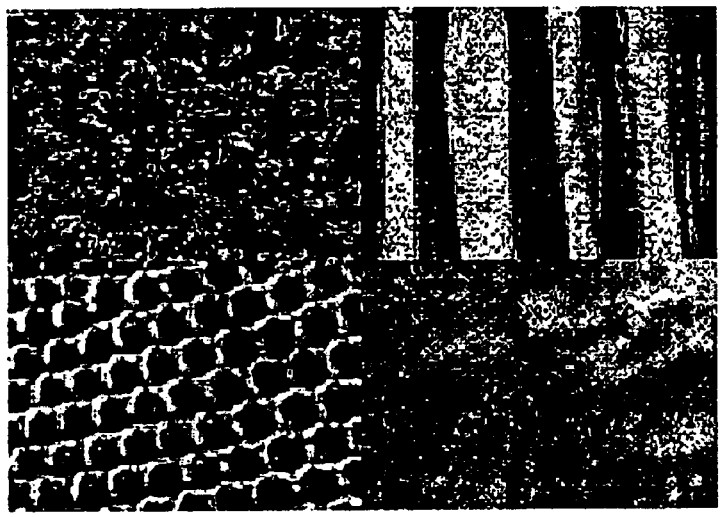

R. M. Haralick, Proceedings of the IEEE, "Statistical and Structural Approaches to Texture", vol. 67, No. 5, May 1979, pp 786–804.

F. W. Campbell et al., J. Physiol, "Application of Fourier Analysis of the Visibility of Gratings", vol. 197, 1968, pp 551–566.

R. De Valois et al., Vision Res., "Spatial Frequency Selectivity of Cells in Macaque Visual Cortex", vol. 22, 1982, pp 545–559.

A.K. Jain et al., Pattern Recognition, "Unsupervised Texture Segmentation Using Gabor Filters", vol. 24, No. 12, 1991, pp 1167–1186.

B.D. Ripley, "Pattern Recognition and Neural Networks", Cambridge University Press 1996.

A.M. Bensaid et al., Pattern Recognition, "Partially Supervised Clustering for Image Segmentation" vol. 29, 1996, pp 859–871.

L. Abele, "Bildsegmentation mettals struktureller Texturanalyse", Springer–Verlag, 1979, pp. 269–279 (with abstract).

O. Pichler et al., "Rotations–und skalenivariante Texursegmentierung mit Mehrkanalfilterung", 1997, pp 79–86 (with abstract).

T. Randen, J.H. Husoy, IEEE Transactions on Pattern Analysis and Machine Intelligence, "Filtering for Texture Classification: A Comparative Study", vol. 21, No. 4, pp. 291–310.

Bela Julesz, Review of Modern Physics, "Early Vision and Focal Attention", vol. 63, 1991, pp 735–772.

Y. Hu et al., IEE Proc.–Vis. Image Signal Process., "Textured Image Segmentation by Context Enhanced Clustering", vol. 141 No. 6, Dec. 1994, pp 413–421.

D.H. Ballard et al., Computer Vision, "Texture as a Pattern Recognition Problem", pp 181–184.

I. Pitas et al., IEE, "Texture Analysis and Segmentation of Seismic Images", Conf. 14, 1989, pp 1437–1440.

* cited by examiner

METHOD AND DEVICE FOR SEGMENTING A POINT DISTRIBUTION

The invention relates to a method for segmenting a point distribution into partial areas with varying structural properties, and a device for executing such a segmentation procedure.

Image segmentation, i.e., dividing an image into segments or partial areas on the basis of specific image features shared within a partial area, is one of the most important tasks in image processing technology. In the simplest case, image segmentation is based on the recognition of differences in gray scale values, e.g., within the environment of a considered image point, or on edge detection techniques. However, only simply structured images with two-dimensionally extended, homogeneous image elements can be segmented in this way. However, practical tasks, e.g., image processing in medical or materials technology, involve more complex image structures, e.g., in the form of differentiated, repeating gray scale value patterns or indistinct delineations of image elements, which cannot be acquired using the simple segmentation techniques.

A series of feature extraction procedures were developed to process more complex images (see M. Tuceryan et al in "Handbook of pattern recognition and computer vision", published by C. H. Cheng et al., World Scientific Publishing, 1993, pp. 235 ff), in which local features corresponding to different image structures or textures are first extracted, and a feature vector composed of these features is then allocated to each image point. Cluster techniques are then used in the feature space to divide the feature vectors of the image points into a few classes, after which the image is segmented into corresponding partial areas on this basis. These procedures are not parameter-free, so that a high level of effort must in some cases be expended on preparation for specific image segmentation in order to determine optimal input parameters. Statistical analyses are also known for evaluating local gray scale value distributions of the image structures (see R. M. Haralick in "Proceedings of the IEEE", Vol. 67, 1979, p. 786 ff), wherein correlation techniques are used for structure acquisition, for example. These conventional techniques are associated with disadvantages relating to data processing outlay and reliability.

E. W. Cambel et al. in "J. Physiol.", Vol. 197, 1968, p. 551 and R. De Valois et al. in "Vision Res.", Vol. 22, 1982, p. 545, describe psychophysiological experiments demonstrating that the human visual system breaks the retinal image down into a number of filtered images, each of which containing intensity variations spanning a single local frequency or orientation range. Feature extraction procedures were developed on this basis using a multi-channel filtering with so-called Gabor filters (see A. K. Jain et al. in "Pattern Recognition", Vol. 24, 1991, p. 1167 ff). In these procedures, a window with a specific filter function is incrementally pushed over the image, and the filter response is further evaluated as the local average for the respectively examined window area. The disadvantage to these procedures is that a linear feature filtering takes place, which enables only limited pattern recognition. For example, a linear filter does not make it possible to recognize texture differences within an image according to FIG. 7a (see below). Filter procedures in which respectively determined averages for a window area are subjected to nonlinear further processing were developed to counter this problem. However, this requires additional information about the patterns to be recognized to achieve a sufficient reliability during texture recognition.

In addition to acquiring the image features according to one of the available procedures, there is another problem involving the evaluation of information contained in the image features to achieve the desired image segmentation. To this end, a so-called cluster analysis is usually performed in a feature space, in which each axis represents one of the examined features. A characteristic marker or label is allocated to each image point, wherein image points with the same label belong to the same feature class or structure, while image points with varying labels must be allocated different structures. The available cluster analyses are described, for example, by R. C. Dubes in "Handbook of pattern recognition and computer vision", published by C. H. Cheng et al., World Scientific Publishing 1993, p. 3 ff., and B. D. Ripley in "Pattern Recognition and Neural Networks", Cambridge University Press, 1996. Unmonitored cluster algorithms, i.e., cluster algorithms without supervision, initially process unmarked data, and therefore require that the following two problems be solved.

First, it is important with respect to the reliability of image segmentation that the correct cluster number be selected and confirmed. Second, it must be ensured that the labels provided by the algorithm reflect physically meaningful features. Another disadvantage to the unmonitored procedures is that they are based on minimizing an image-encompassing (global) energy function through iterative methods. This leads to a tendency toward solutions that yield balanced cluster occupations (see A. M. Bensaid et al. in "Pattern Recognition", Vol. 29, 1996, p. 859 ff).

The problems discussed above are encountered not just during the segmentation of images that represent the optical mapping of a scene with material objects. Instead of the two-dimensional formation examined in the process, in which a gray scale value is allocated to each image point, for example, an image in the broadest sense can also be a lower or higher dimensional formation, in which each image point is first defined by a number of coordinates corresponding to the dimension of the formation, and a specific number of image features (measured values) is allocated to each image point. In addition to spatial and time dimensions, the formation dimensions can be expanded to include any additional feature axes. In the broadest sense, then, the examined systems encompass all physical, chemical or biomedical processes or materials whose state or individual features can be characterized with a set of n parameters according to the dimension. The systems can be invariable (static) or chronologically variable (dynamic) within the examination period. In the latter case, the time is one of the n parameters.

DE-OS 43 17 746 discloses a spatial filter procedure for recognizing structures in n-dimensional images based on the concept of the so-called isotropic scaling factor $\alpha$. Scaling factor $\alpha$ describes the change in point density (gradient) around an examined image point by indicating the surrounding point number as a function of the distance from the examined image point. DE-PS 196 33 63 describes the expansion of this spatial filter procedure to recognizing the orientation of structures in n-dimensional images. This concept introduces anisotropic scaling factors $\alpha_{ji}$ that are characteristic for the point density variation after projection on specific directions in space. Spatial filtering based on the scaling factors constitutes a nonlinear procedure, which has been successfully used during pattern recognition and also nonlinear time sequence analysis. However, this did not enable image segmentation relative to different textures in the examined image.

The object of the invention is to provide an improved method for segmenting a point distribution relative to textures that overcomes the mentioned disadvantages to conventional procedures, and in particular has a high sensitivity and reliability, requires as little advance information as possible about the point distribution, and can be used on as wide a scale as possible in the most varied of tasks, both in terms of conventional optical images, and of lower or higher dimensional formations. The object of the invention is also to provide a device for realizing such a method and applications of the method.

This object is achieved by means of a method or device with the features set forth in claims 1 and 9. Advantageous embodiments and applications of the invention are described in the subclaims.

In a first important aspect of the invention, a method for the partially monitored segmentation of point distributions is provided in which structure or texture features are determined for each point using the mentioned concepts of isotropic and anisotropic scaling factors, and a cluster procedure with partial supervision is used for segmentation. In the cluster procedure, each point is allocated to one of the predetermined texture classes, proceeding from a predetermined number of known classes of structural elements (texture classes) and their allocation to specific points (reference points, points with labels) and a distance measure that defines the difference between the respective texture features and each of the texture classes for each of the remaining points (points without labels). The number of reference points is selected as a function of application, in particular as a function of image size, in such a way that enough points can be taken into account for a statistically reliable assessment for each texture class. Each texture class should preferably encompass approx. 30 to 40 (or even 100) reference points.

The mentioned allocation takes place for the initially unclassified points without labels via the evaluation of the distance measure, preferably by allocating the respective point to the texture class from which it exhibits the lowest distance. The cluster procedure realized according to the invention is referred to as partially monitored or as a procedure with partial supervision, since the limited number of reference points are classified with a known texture allocation. This ensures that image segmentation proceeds from a sufficient cluster number and physically meaningful labels. One special advantage to the invention lies in the fact that image segmentation is highly reliable, even if the number of reference points is substantially lower (the percentage of reference points can lie under 1%, e.g., 0.1%) than the number of label-free points.

In a preferred embodiment of the invention, the distance measure is defined for each texture class specifically as a function of the orientation and form of the point set that was allocated to the predetermined texture within the framework of partial supervision. However, use can also be made of more easily defined distance measures defined jointly for all texture classes in the global feature range of the point distribution.

All points in the point distribution that are allocated to a texture class form a texture segment, which is subsequently displayed or subjected to further processing.

In another important aspect of the invention, a device is described for realizing the texture segmentation procedure. This arrangement encompasses a device for measuring the point distribution and the feature of the respective system state belonging to each point, a filter device with means for scanning the examined points in the point distribution, means for counting points in the environment of examined points, means for acquiring predetermined scaling factors, and means for statistically processing the scaling factors, an input device designed to allocate predetermined reference points for which a texture class affiliation is known to the corresponding texture classes, a calculating device for ascertaining and evaluating distance measures for the texture features of the remaining points relative to the texture classes, and an output device, with which the texture segments are displayed, temporarily stored or passed on for further processing.

In the broadest sense, the point distributions processed according to the invention can represent system states in an n-dimensional state space. The point distribution represents a two- or higher dimensional mapping of the system state, so that reference is generally made to image segmentation and image points below. The segmented images can also encompass signal or amplitude progressions as a function of a reference parameter (e.g., time, energy, etc.) or optical gray scale value and/or color images. In addition to image patterns, the examined systems can also include in particular materials, mechanical devices or biological systems. Depending on the application, a system state is acquired via measures involving actor and sensor technology, analysis and recording or signaling. The potentially required actor technology involves measures for generating system reactions representative for characteristic states, e.g., the excitation of mechanical oscillations in an object under examination, or the initiation of evoked potentials in neurological systems. The sensor technology encompasses the detection of system features with respect to the relevant n parameters, and the display of features in a high dimensional feature space, e.g., via the storage of suitable value groups that are allocated to the features.

In the examined point distribution of image, a complex, yet definable image structure is called a texture. A texture forms an image area or image region, in which the image structure can be traced back to a recurring pattern that accommodates elements according to a configuration rule. In other words, a specific (constant) texture can be allocated to an image region if a set of local statistics or other local properties of the image features is constant or only changes a little. An image texture is described by the number and type of its (gray) tone basic elements, and the spatial arrangement of these elements.

In general, the following properties can be allocated to the textures. A local sequence repeats over an image region, which is large compared to the size of the local sequence. In this case, the sequence consists of an ordered arrangement of basic constituents, which form roughly equal units as so-called micro-patterns, have the same size within the texture, and can be characterized by specific local properties.

In applications involving image processing, e.g., in medical or material technology, the recognition and segmentation of textures makes it possible to differentiate between various object areas. For example, when examining ultrasound images of the inner tissues, texture segmentation makes it possible to differentiate between tumors and healthy tissue, and determine the size of the tumor tissue. In this case, the automation of the recognition and size indication process is of particular interest. Texture segmentation according to the invention generally allows both the allocation of textures to specific points and a determination of the size of the respective image regions with a constant texture.

The invention offers the following advantages. The texture segmentation procedure is parameter-free and non-iterative, as explained in detail below. No free parameters need to be optimized during the classification of image features. As a result, the method has a high segmentation rate and reliability. The segmentation result is slightly sensitive to the specific selection of boundary conditions during image evaluation. A nonlinear filter technique for texture feature extraction is introduced for the first time. The segmentation procedure can be used without any problem for any tasks by adjusting the nonlinear filtering process as a function of application. For the first time, textures can be simultaneously recognized and quantitatively analyzed in relation to their expansion.

Figure 1B:
Figure 2:
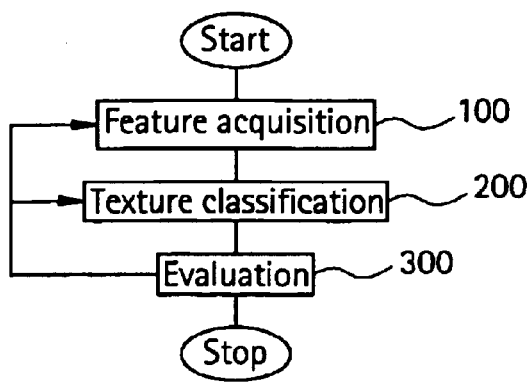
Figure 3:
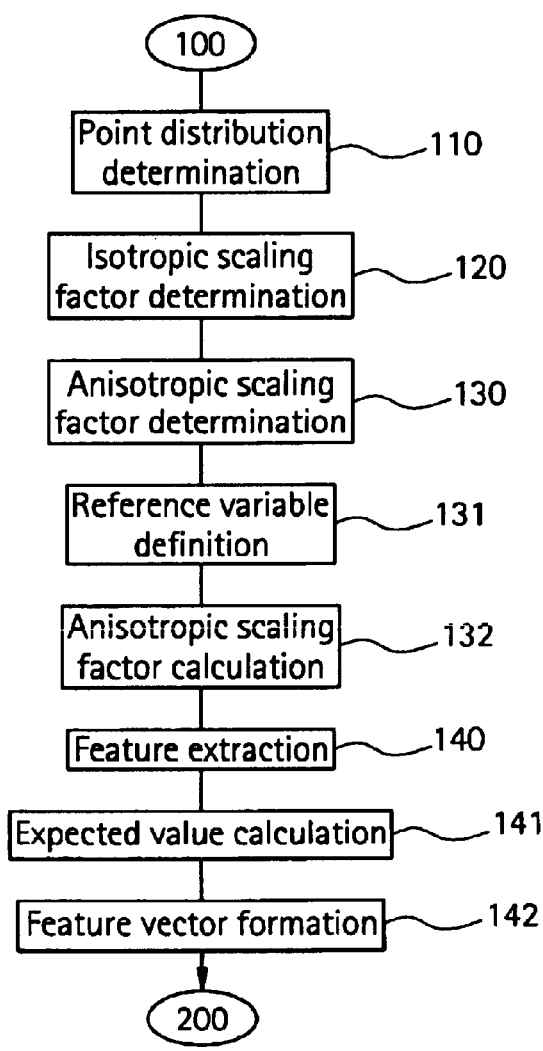
Figure 4:
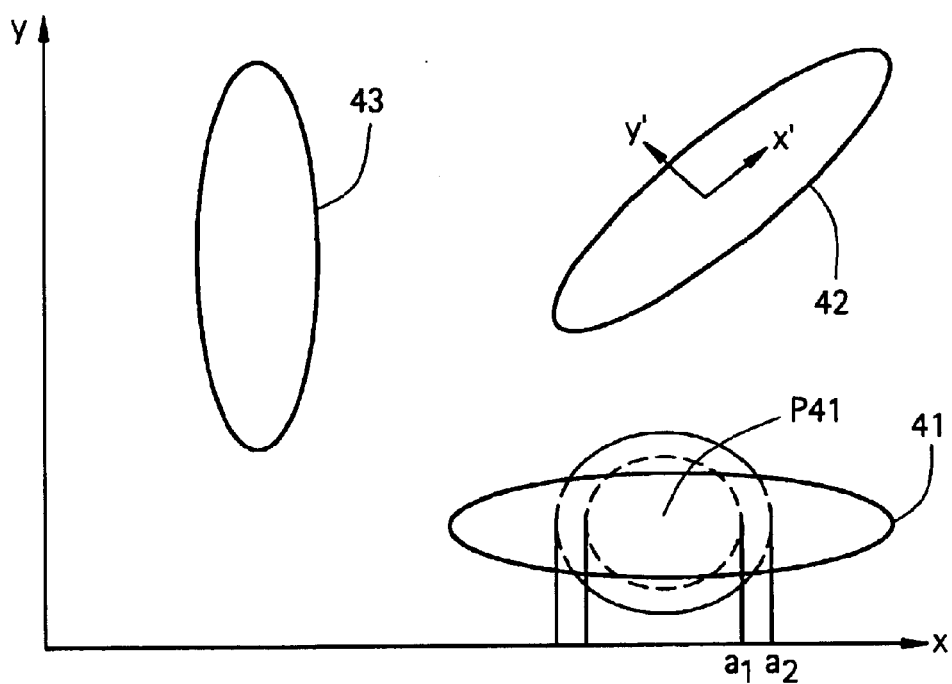
Figure 5:
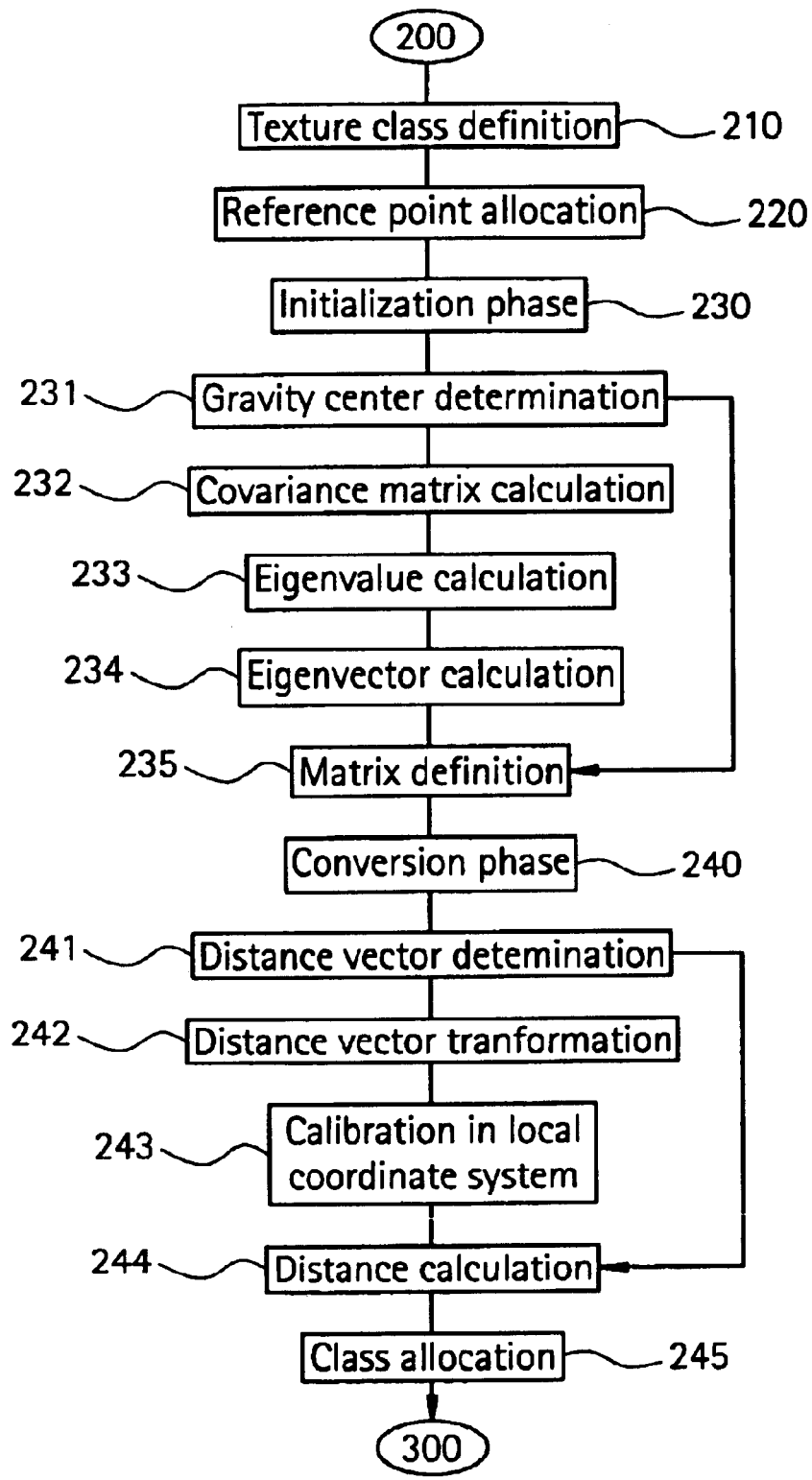
Figure 6:
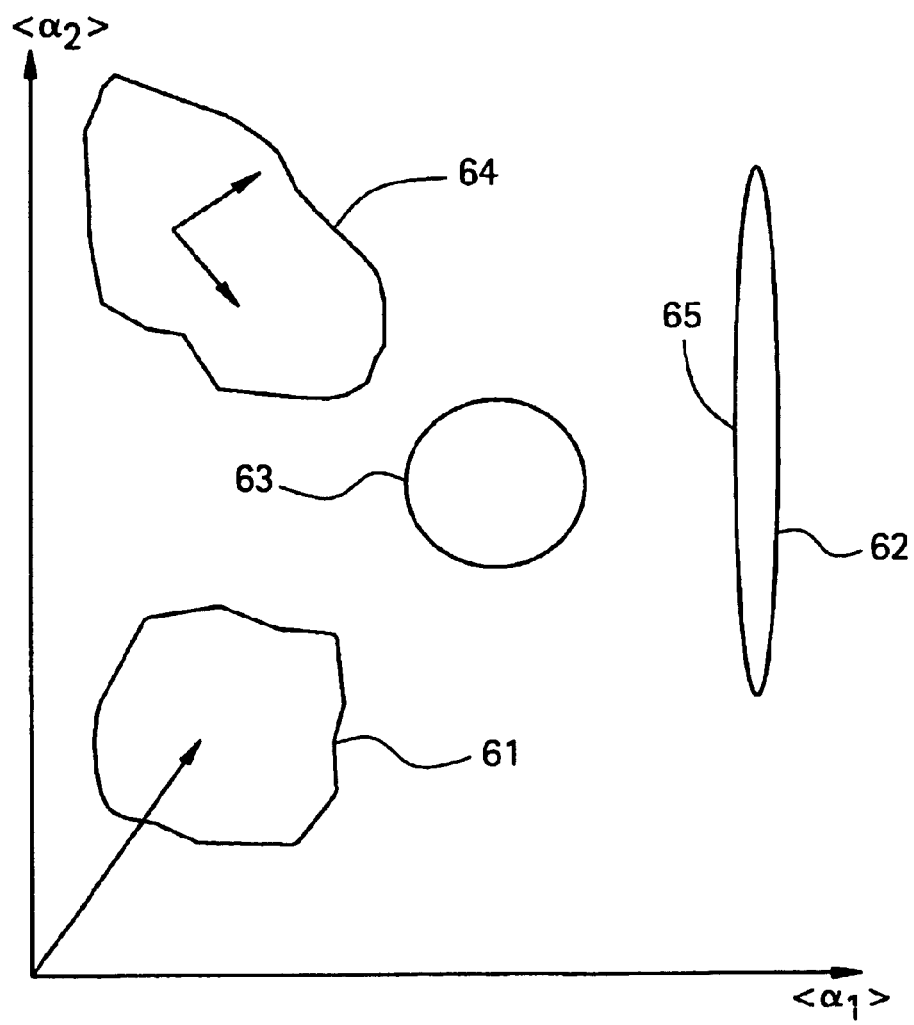
Figure 10A:
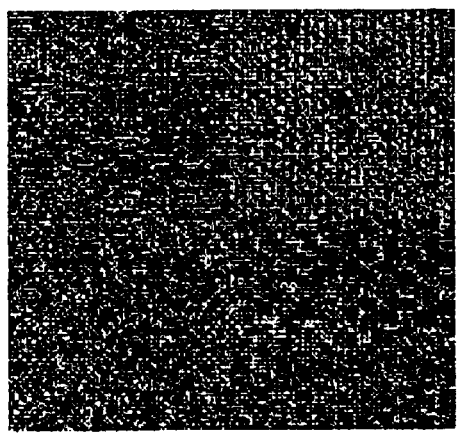
Figure 10B:
Figure 10C:
Figure 10D:
Figure 10E:
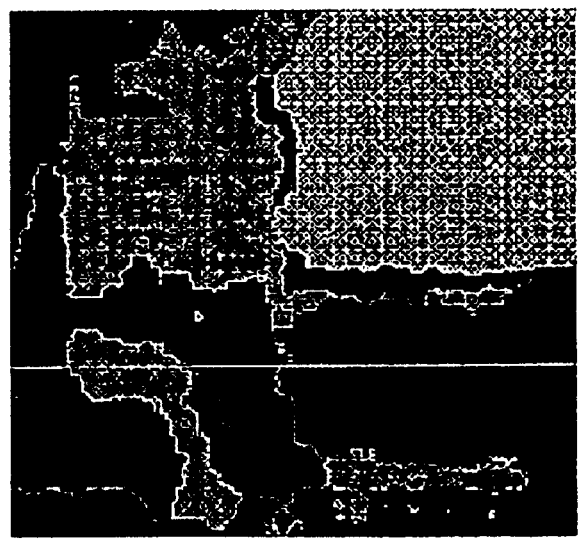
Figure 11:
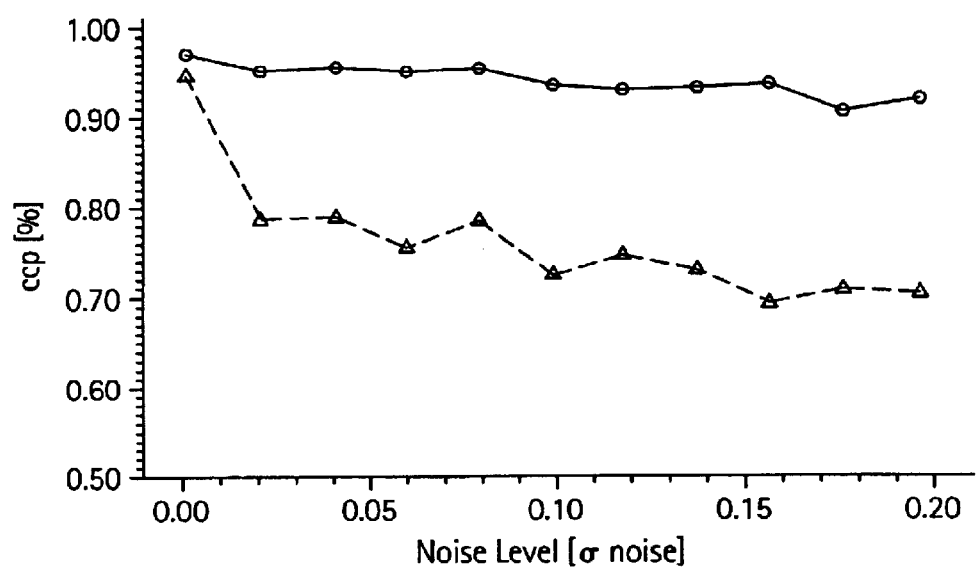
Figure 12:
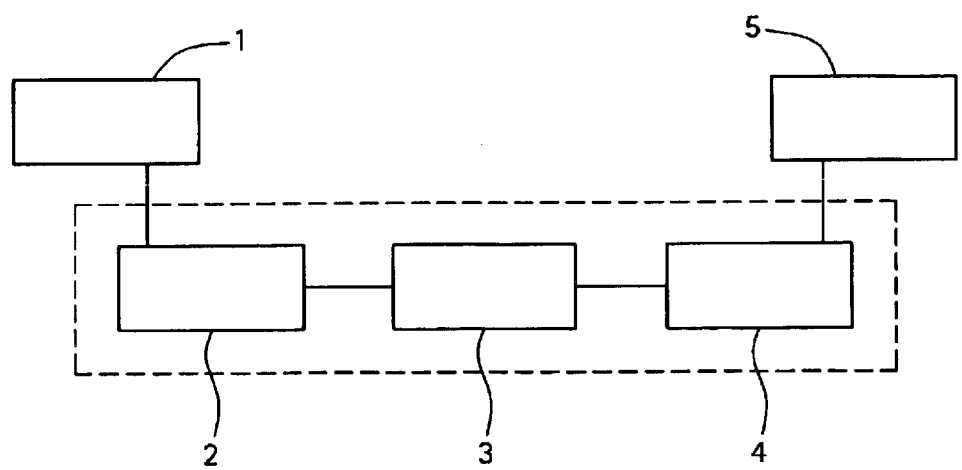

Other advantages and details of the invention will be described below drawing reference to the attached flowcharts and drawings. Shown on:

FIG. 1 is an example for a pixel image with four natural textures (a) and the result of texture segmentation into four feature classes (b), FIG. 2 is a flowchart to illustrate the main steps involved in texture segmentation according to the invention, FIG. 3 is a flowchart to illustrate feature acquisition in a procedure according to FIG. 2, FIG. 4 is an illustration to determine a number of anisotropic scaling factors for an image point, FIG. 5 is a flowchart to illustrate texture classification in a procedure according to FIG. 2, FIG. 6 is an illustration to explain the initialization phase in a procedure according to FIG. 5, FIG. 7 is an image sequence to illustrate the segmentation of Brodatz textures with an original image (a), a filtered image (b) and a feature image (c), FIG. 8 is an image sequence to illustrate the segmentation of a pixel image with two artificial textures with an original image (a), a depiction of the reference point for classification (b), and a segmentation image (c), FIG. 9 is another image sequence to illustrate the image segmentation of an original image (a) with the use of varying distance measures (b, c), FIG. 10 is an image sequence to illustrate texture segmentation in a grainy original image (a) and segmentations with varying distance measures (b–e), FIG. 11 is a curve depiction to illustrate texture segmentation at varying levels of graininess, and FIG. 12 is a diagrammatic overview of a texture segmenting arrangement according to the invention.

Texture segmentation according to the invention will be explained below using two-dimensional gray scale value images as an example, but is not limited thereto, but rather is applicable in the corresponding manner to any point distributions and feature combinations. For example, the point distribution can also be generated by several synchronously recorded time series of sensor signals, e.g., on a machine, wherein segmentation according to the invention is directed toward the search for specific time intervals within the time series, e.g., in which normal operating conditions of the machine or special faults are given. The examined point distributions can be continuous or discrete. The depicted image examples have been simplified in part for printing-related reasons, or provided with artificial structures (hatched lines or the line), without constituting mandatory features of the invention. The individual steps involved in segmentation according to the invention will first be explained below drawing reference to FIGS. 2 to 6. Subsequently, examples will be provided to illustrate the realization of the individual steps, and a device for implementing the procedure will be described.

A) Segmentation Procedure

A two-dimensional gray scale value image G(x,y) with size N·M is considered (N, M: number of image points or pixels in the x or y direction). A discrete gray value g(x, y) is allocated to each pixel (g ∈[0; 255]). The location and feature information allocated to each pixel generates a higher dimensional formation, which is a three-dimensional point distribution in this example. In this distribution, a three-dimensional vector $\bar{p}_i=(x,y,g(x,y))$ is allocated to each pixel. To ensure that the x-, y- and g-values lie in a comparable value range, it may be necessary to norm the gray values $g_i$. One possible norm takes the form of $g_{norm}=g\cdot(N/255)$. Hence, the pixel image is viewed as a point distribution in an artificial three-dimensional embedding space.

FIG. 1a shows an example for a pixel image G. The pixel image with N=M=256 contains four natural textures, which are readily identified upon visual inspection as a simple striped pattern (top right), regular honeycomb pattern (bottom left), completely irregular pattern with sharply delineated structures (top left) or irregular "indistinct" pattern (bottom right). Image segmentation according to the invention is directed toward executing this texture recognition via the acquisition of local features of the pixel image for each image point, and classifying the image points based on the acquired features. An overview of these steps is provided on FIG. 2 with feature acquisition 100, texture classification 200 and evaluation 300. Depending on the application, the evaluation may result in a further feature acquisition and/or texture classification.

1) Feature Acquisition

Feature acquisition 100 (see FIG. 3) is aimed at determining local features for each image point. The local features encompass characteristic image properties in the immediate environment of the image point, which is substantially smaller than the (global) overall image. Specifically, feature acquisition 100 involves determining the point distribution 110, determining scaling factors 120, 130 and a feature extraction 140 to generate feature vectors, which are allocated to each image point.

In the example in question, the determination of point distribution (step 110) involves a simple image recording and a known gray scale value evaluation (if necessary normed as specified). In general, step 110 encompasses recording measured values based on the sensor technology selected as a function of application.

With respect to determining the isotropic and anisotropic scaling factors (steps 120, 130), reference is made to the aforementioned DE-OS 43 17 746 and DE-PS 196 33 693. The procedures are known in the art, and will hence only be partially explained in detail here.

First, the isotropic scaling factor (scaling index) is determined for each image point (step 120). To this end, two spheres with differing radii $a_1$, $a_2$ ($a_1<a_2$) are concentrically placed around each point $\bar{p}_i$, in the location and gray scale value space. A specific number of image points are situated within each sphere, each with a gray scale value also designated as the overall mass M (respectively related to the sphere radius $a_{1,2}$). According to equation (1), the isotropic scaling factor α is obtained as a logarithmic derivation of overall masses for both spheres:

$$\alpha(x_i, y_i \mid a_1, a_2) = \frac{\log(M(a_2)) - \log(M(a_1))}{\log a_2 - \log a_1} \quad (1)$$

mit $$M(x_i, y_i \mid a) = \sum_{x,y} \Theta(a - \|\bar{p}_i - \bar{p}\|_2), \quad (2)$$

wherein $x_i$, $y_i$ denote the coordinates of the image point in question, Θ the Heaviside function and $\|\cdot\|_2$ the Euclidian norm. The scaling factor calculation represents a filter function, while the coordinates $x_i$, $y_i$ denote the midpoint of the filter.

Strong point density gradients around the image point in question yield a high scaling factor, while low gradients only produce a low scaling factor. The isotropic scaling factor $\alpha$ is here only characteristic for radial gradients, however. For applications with complex structures, it is necessary to also determine orientation properties for the local features. This is done by determining the anisotropic scaling factors (step 130).

The anisotropic scaling factors are determined similarly to the isotropic scaling factors, from gradients in the density of the environment points of a point in question, wherein the projections of the point numbers (projected masses $M_x$, $M_y$) are ascertained from environment points to determine an orientation of the formation. To determine whether the environment points around an examined point even have an orientation, it would essentially suffice to find two anisotropic scaling factors in a two-dimensional pixel image that each relate to the x or y axes of the pixel image. One characteristic of feature acquisition for image segmentation according to the invention involves ascertaining not just one value pair or value tuple from anisotropic scaling factors according to the dimensionality of the image in an examined image for each image point. According to the invention, several value pairs or value tuples of anisotropic scaling factors are determined according to the principles set forth with reference to FIG. 4.

FIG. 4 shows an example of three differently oriented structures 41, 42 and 43 in a two-dimensional pixel image. The structures have a characteristic rotational angle $\phi$ of 0°, 45° or 90° relative to the x-axis. The determination of anisotropic scaling factors $\alpha_x$ or $\alpha_y$ is illustrated for the structure 41 by penciling in the spheres with radii $a_1$, $a_2$. The projection of environment points belonging to the structure 41 for the examined point $P_{41}$ exhibit strong gradients in the y-direction, and weaker gradients in the x-direction. This results in a low scaling factor $\alpha_x$ and a high scaling factor $\alpha_y$. Conditions are correspondingly different for structures 42 and 43.

It is shown that the anisotropic scaling factors can be used to show that the environment points have an orientation. However, the individual alignment of the orientation cannot be derived. This information can only be obtained if the anisotropic scaling factors for each examined point are determined in at least two coordinate systems rotated relative to each other. The scaling factors in the x, y and x*, y* coordinate systems (see structure 42) yield additional information about the structural alignment given knowledge of the rotational angle ($\neq 90°$) between the coordinate systems.

Therefore, the determination of anisotropic scaling factors in the procedure according to the invention (step 130) involves the acquisition of a scaling factor tuple comprised of several scaling factors each corresponding to the rotated coordinate systems for each examined image point. The principle of scaling factor determination in rotated coordinate systems shown in simplified form with reference to FIG. 4 is adapted to the application. This is represented on FIG. 3 by the step 131 of defining reference variables for scaling factor determination. These reference variables comprise the number of anisotropic scaling factors examined per image point, the sphere sizes and number and angle of coordinate system rotations.

An angle scheme in which four rotational angles are set, each differing by 45°, has been proven advantageous for the evaluation of gray scale value images during coordinate system rotation. Therefore, one or two anisotropic scaling factors are determined for each image point in four coordinate systems each rotated by rotational angle $\phi$. It is emphasized that the number and level selected for the coordinate system rotations can be higher or lower depending on application. In this case, it does not matter that the respectively determined anisotropic scaling factors can be interpreted in a certain way or correlated with visually detectable image features. It is only important that several values be obtained for varying coordinate system rotations, since these values contain the complete information required for further texture classification (see below).

In order to calculate the anisotropic scaling factors, one proceeds from the projected local masses $M_{x^*}$ according to equation (3).

$$M_{x^*}(x_i, y_i \mid a, \phi) = \sum_{x,y} \Theta(a - \|x_i^* - x_3^*\|_2) \Theta(a_2 - \|\vec{p}_1^* - \vec{p}_3^*\|_2). \quad (3)$$

The x* axis represents the spatial direction within the rotated coordinate system to which the scaling factor is related. In equation (3), $\vec{p}^*$ denotes the vectors of the image points in the rotated coordinate system. The transition from the original coordinate system ($\vec{p} = (x,y,g)$) to the rotated coordinate system ($\vec{p}^* = (x^*, y^*, g^*)$) is achieved according to $\vec{p}^* = D \cdot p$ with the rotation matrix D from equation (4).

$$D = \begin{pmatrix} \cos\phi & \sin\phi & 0 \\ -\sin\phi & \cos\phi & 0 \\ 0 & 0 & 1 \end{pmatrix}, \quad (4)$$

Rotation matrix D is the known rotation matrix, wherein the g-axis is here the rotational axis. The second Heaviside function in equation (3) ensures that only points near the examined image point are taken into account. Similarly to equation (1), calculating the logarithmic derivation of projected masses $M_{x^*}$ according to equation (5) yields the anisotropic scaling factors $\alpha$:

$$\alpha(x_i, y_i \mid a_1, a_2, \phi) = \frac{\log M_{x^*}(a_2, \phi) - \log M_{x^*}(a_1, \phi)}{\log a_2 - \log a_1} \quad (5)$$

The anisotropic scaling factor $\alpha$ according to equation (5) is calculated for each image point for four respectively different rotational angles $\phi$. In the image examples described below, rotational angles 0°, 45°, 90° and 135° were used. Since the orientation information for each rotational angle is already contained in one of the two anisotropic scaling factors, which belong to a rotational angle, it is sufficient for subsequent texture classification if only one anisotropic scaling factor is determined for each rotational angle.

In a preferred embodiment of the invention, the scaling factors were determined not just for a sphere pair, but for two sphere pairs. In the 256·256 pixel images examined here, a smaller scaling range with sphere radii $a_1=2$ and $a_2=6$ and a larger range with $a_1=6$ and $a_2=12$ proved to be advantageous. Additional scaling ranges (sphere pairs) can also be taken into account.

Therefore, two isotropic and four anisotropic scaling factors that represent varying nonlinear filter functions for characterizing the textured image are obtained for an image point given two scaling ranges and four rotational angles. As demonstrated below, an outstanding segmentation result can already be derived using this set of ten scaling factors. Depending on the application, these parameters can be adapted to the specific task, or even optimized during the segmentation process, however.

Feature acquisition 100 (see FIG. 3) is followed by feature extraction 140, which results in a feature vector $\vec{x}$ for each image point. The feature vectors $\vec{x}$ represent the input variables for the ensuing texture classification 200 (see below).

In a simple case, the components of the feature vectors are formed by the local features determined for each image point. In the above example, the feature vector hence encompasses ten components comprised of two isotropic and eight anisotropic scaling factors.

However, in a preferred embodiment of the invention, a statistical evaluation of the local features determined for the image points is first performed within the framework of step 141, followed by vector formation 142 out of local expected values. The accompanying local expectation value $\langle\alpha\rangle$ for each local feature is computed according to equation (6).

$$\langle\alpha(x_i, y_i)\rangle = \frac{1}{k^2} \sum_{x,y} \alpha(x, y) \Theta\left(\frac{k}{2} - |x_i - x|\right) \Theta\left(\frac{k}{2} - |y_i - y|\right) \quad (6)$$

Parameter k here represents the size of a window shifted over the image points for taking neighboring local features into account. In the image examples described below, a window size of k=40 was proven to be beneficial. As a result, ten expected values are formed for each image point, which take into account the local features of the adjacent image points. The advantage to this statistical processing of local features is that the ensuing texture classification is influenced significantly less by limiting effects on the image edges as a consequence. It has been shown that the limiting effects on the image edges need not even be considered at all to still achieve good segmentation results.

Feature acquisition 100 ends with the determination of feature vectors $\vec{x}_i$ from the scaling factors or expected values for the scaling factors. Actual texture classification (clustering) 200 according to FIG. 5 now follows for additional image segmentation.

2) Texture Classification (Clustering)

The n feature vectors $\vec{x}_i$ form a set X according to equation (7).

$$X = \{\vec{x}_1, \vec{x}_2, \ldots, \vec{x}_n\} \quad (7)$$

In a first step 210, a finite number of texture classes arising in the image in question are first examined. These predetermined texture classes are respectively defined or entered from a storage medium, depending on application. An index i (i=1, . . . , c) is allocated to each texture class (number c). Depending on application, the texture classes are defined from experimental values, or within the framework of an optimization, in which image segmentation is performed repeatedly with varying class numbers and types.

Within the framework of the partial supervision used according to the invention, it is now assumed that the allocation to a specific texture class is known for a specific, limited number of image points. Specific labels 1 to c ("labels") can hence be allocated to certain image points or image vectors. The remaining image points or image vectors are left without labels ("unlabeled"). According to equation (8), this can be written with reference to the set X introduced above:

$$X = \{\underbrace{\bar{x}_1^1, \ldots, \bar{x}_{n1}^1}_{\text{label 1}}, \underbrace{\bar{x}_1^2, \ldots, \bar{x}_{n2}^2}_{\text{label 2}}, \ldots, \underbrace{\bar{x}_1^c, \ldots, \bar{x}_{nc}^c}_{\text{label c}}, \underbrace{\bar{x}_1^u, \ldots, \bar{x}_{nu}^u}_{\text{unlabeled}}\} \quad (8)$$

$$X = X^l \cup X^u$$

In equation (8), the superscript indices each relate to a label or the undesignated state without a label (u). The subscript indices run from 1 to n (see equation (7)). The partial quantity $X^u$ is significantly greater than partial quantity $X^l$ of the feature vectors, for which the label is known.

The allocation of reference points with labels to the known texture classes (step 220) is followed by the actual steps of the cluster procedure, namely the initialization phase 230 and conversion phase 240. During the initialization phase 230, so-called ellipsoidal distance measures or a Euclidian distance measure is defined in the feature space, which establish specific scales for the reference points allocated to a respective texture class. During the ensuing conversion phase, the remaining image points are allocated to the varying texture classes based on the distance measures or metrics.

(2a) Initialization Phase

The initialization phase 230 involves the steps of gravity center calculation 231, covariance matrix calculation 232, eigenvalue calculation 233, eigenvector calculation 234 and metrics definition 235. These steps are carried out in the high-dimensional feature space, which is fixed by the components of the feature vectors. In this example, the feature space is hence 10 dimensional. The steps involved in the initialization phase will be described below drawing reference to the simplified depiction in a two-dimensional feature space according to FIG. 6.

In the feature space, the points of a texture each represent a texture class as cohesive formations, which are also referred to as clusters. FIG. 6 shows four clusters 61–64 for two randomly selected components of the feature space according to the expected values for the scaling factors $\alpha_1$ and $\alpha_2$. The objective of the initialization phase 230 is to determine to which cluster, and hence to which texture class, an initially unclassified point 65 (without label) is to be allocated. In a simple allocation procedure, a point without a label could simply be allocated to the cluster to which it has the lowest Euclidian distance. However, this can result in false allocations if the expansion and alignment of the cluster is not also taken into account. In the example shown, the point 65 has a slight distance to the cluster 62, but the cluster has a very characteristic longitudinal extension. For this reason, it might be more likely that point 65 belongs to the more distant cluster 63, since this allocation is more compatible with the radial expansion of this cluster. In the initialization phase 230, a separate distance measure depending on the characteristic properties of the cluster orientation and formation is hence defined for each cluster, i.e., for each texture class.

Gravity center calculation 231 takes place first. The cluster center is here calculated with the location vector $\vec{v}^i$ in the feature space according to equation (9)

$$\bar{v}^i = \frac{1}{n_i}\sum_{k=1}^{ni} \bar{x}_k^i \qquad (9)$$

for each cluster or each texture class i. The components ($v_1^i$, $v_2^i$, ... $v_d^i$) Of the vector $\vec{v}^i$ are the gravity center coordinates of the cluster formed by the feature vectors $\vec{x}_k^i = (x_{1k}^i, x_{2k}^i, \ldots x_{dk}^i)$. The d here denotes the number of dimensions in the feature space. The gravity center is symbolically entered on FIG. 6 for the cluster 61.

Finally, step 232 involves calculating the covariance matrix $C^i$ for each cluster 1, whose elements $C_{rs}^i$ are given by equation (10).

$$C_{rs}^i = \frac{1}{n_i}\sum_{k=1}^{ni}(x_{rk}^i - v_r^i)\cdot(x_{sk}^k - v_s^i) \text{ with } r, s = 1, 2, \ldots, d. \qquad (10)$$

The elements of the covariance matrices establish a link between the deviation of components in each feature vector and the gravity center of the respective cluster i. In a simplified case according to FIG. 6, these constitute the deviations in the abscissa and ordinate directions. Matrices $C^i$ are symmetrical, thus enabling diagonalization and main axis transformation.

In the ensuing step 233, the eigenvalues $\lambda_1^i, \lambda_2^i, \ldots, \lambda_d^i$ of the matrix $C^i$ are calculated for each cluster i. The square roots of the eigenvalues correspond to the standard deviations of the point distributions $\{\bar{x}_k^i\}$ (k=1, 2, ..., $n_k$) relative to the respective main axes. Finally, the eigenvectors for each matrix $C^i$ are calculated in step 234. The eigenvectors form the matrices $D^i$ according to equation (11).

$$D^i = \begin{pmatrix} \vec{d}_1^i \\ \vec{d}_2^i \\ \ldots \\ \vec{d}_d^i \end{pmatrix} = \begin{pmatrix} d_{11}^i & d_{12}^i & \cdots & d_{1d}^i \\ d_{21}^i & d_{22}^i & \cdots & d_{2d}^i \\ \ldots & \ldots & \ldots & \ldots \\ d_{d1}^i & d_{d2}^i & \cdots & d_{dd}^i \end{pmatrix} \qquad (11)$$

Matrices $D^i$ describe the transition from the original coordinate system shared by all clusters to a cluster-specific coordinate system fixed by the main axes of the respective cluster i. This coordinate system is illustrated based on the cluster 64 on FIG. 6, for example.

Therefore, a local coordinate system whose axes are calibrated by the formation of the respective cluster is introduced for each texture class introduced within the framework of partial supervision in the initialization phase 230. The local calibrations yield information about the orientation and formation of the respective clusters, and hence make it possible to define cluster-specific distance measures local to the feature space (ellipsoidal metrics). These distance measures are defined during step 235. The coordinates of the cluster centers, the square roots of the eigenvalues and the eigenvectors are stored for each texture class or each cluster. This yields $N_{var} = i \cdot (2\cdot d + d^2)$ variables according to the number of various clusters (classes) i and the dimension of the feature space d, for each cluster d, since d parameters $\lambda_j$, d location coordinates of the cluster centers and $d^2$ eigenvectors are taken into account for each cluster. These variables determine the ellipsoidal distance measures (metrics) in the feature space, in which the cluster allocation of the remaining points without labels takes place (see also equation (15)).

It must be noted that the distance measure definition with steps 232 to 234 covered herein is not a compulsory feature of the invention. Image segmentation based on the feature vectors determined via nonlinear filtering during feature acquisition 100 can also be realized using a simpler distance measure, e.g., based on the Euclidian distance between an image point and the gravity center of a cluster. Accordingly, steps 232 to 234 could be skipped (dashed arrow on FIG. 5). However, the selection of distance measure impacts the quality of image segmentation (see FIGS. 10, 11).

(2b) Conversion Phase

In the conversion phase 240, previously unclassified image points are allocated to a cluster based on the distance measure belonging to this cluster. To this end, the distance vectors $\vec{y}_1^{i*}$ for each of the y cluster centers are calculated in step 241 for each image point without a label $\vec{x}_1^u$ (1=1, 2, ..., $n_u$) according to equation (12).

$$\vec{y}_1^{i*} = \vec{x}_1^u - \vec{v}^i. \qquad (12)$$

The distance vectors $\vec{y}_1^{i*}$ are subsequently transformed into the coordinate systems of the main axes for each cluster (step 242). This is done according to equation (13) using the transfer matrices $D^i$.

$$\vec{y}_1^i = D^i \cdot \vec{y}_1^{i*}. \qquad (13)$$

As a result, c distance vectors corresponding to the c local coordinate systems of the clusters are present for each unclassified image point. In each coordinate system, the components of the vectors $\vec{y}_1^{i*}$ are calibrated relative to the standard deviations of each cluster using the eigenvalues of the respective local covariance matrix Ci (step 243).

This calibration is performed according to equation (14):

$$z_1^i = \frac{y_{rl}^i}{\sqrt{\lambda_r^i}} \qquad (14)$$

Based on the calibrated components, the distances of each image point to be classified to each of the i cluster centers are calculated according to equation (15) (step 244).

$$\Delta_1^i = \sqrt{\sum_{r=1}^d (z_{rl}^i)^2} \qquad (15)$$

Finally, the feature vector $\bar{x}_1^u$ (or accompanying image point) is allocated to the cluster or texture class for which variable $\Delta_1^i$ has the lowest value (step 245). As a result, the number of all image points is completely classified, i.e., each image point is allocated to a cluster or a texture class.

If classification takes place with a simple Euclidian distance, step 241 encompasses calculating the vectors of an image point for each gravity center of the clusters. Then, one can proceed directly to step 241.

(3) Evaluation

Within the framework of subsequent evaluation 300 (see FIG. 2), there now takes place a segmentation step in which image points that have been allocated to a shared cluster are provided with a shared label, stored together and/or marked in a display of the processed image by a false color depiction. Simultaneous to this segmentation, the image points belonging to a texture class also readily permit a size determination of the partial area of the image formed by a texture according to one of the known numerical evaluation procedures. Additional steps during evaluation 300 include the relaying of texture data to various auxiliary processors and/or displays configured as a function of application. A partial area can be self-contained or consist of several segments separated from each other.

Compliance with a quality standard can also be checked within the framework of the evaluation 300, and given a negative result, a return to feature acquisition 100 or texture classification 200 can be effected with the establishment of new parameters. Quality standards include correctly classified image points known in advance. To this end, the procedure outlined above can be modified so that not all known image points are taken into account during step 220 and incorporated in to the ensuing initialization phase 230. Initialization can be performed with a first portion of known image points with a known texture classification. The result of the conversion phase 240 can then be checked using the remaining known image points.

B) Experimental Results

Results of image segmentation according to the invention based on the example of gray scale value images with natural or artificial textures will be presented below drawing reference to FIGS. 1 and 7 to 11. FIG. 1 shows a 256·256 pixel image with four natural textures that were already specified above (FIG. 1a). These involve the Brodatz textures D03, D90, D93 and D51. FIG. 1b shows the segmentation result. 97.3% of the image points were correctly classified. As also revealed, the boundaries between the textures are reproduced relatively well.

Figure 7A:
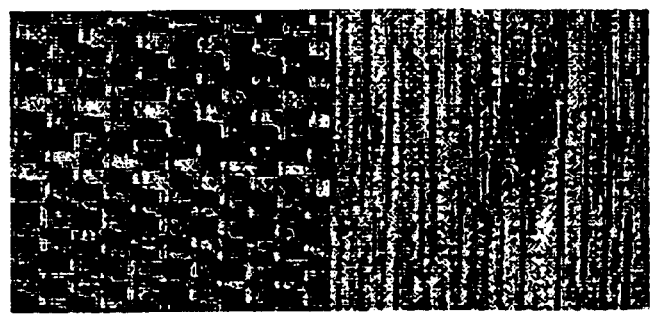
Figure 7B:
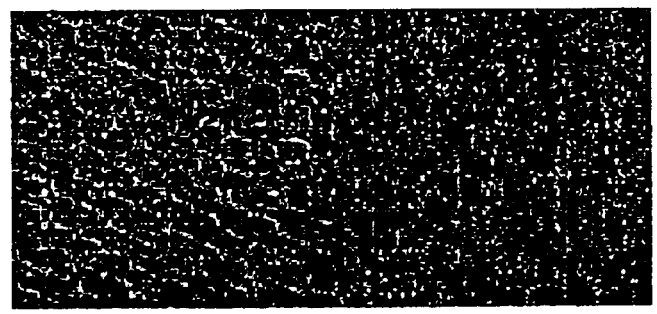
Figure 7C:
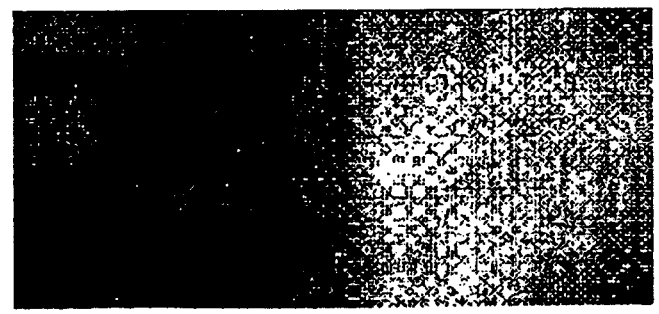

FIG. 7 shows additional Brodatz textures in a 128·256 pixel image. The original textures D55, D68 are depicted on FIG. 7a. FIG. 7b shows the image of the ansotropic scaling factors filtered with the parameters $a_1=6$, $a_2=12$ and $\phi=45°$. FIG. 7c is obtained after a smoothing according to the aforementioned step 141.

Figure 8A:
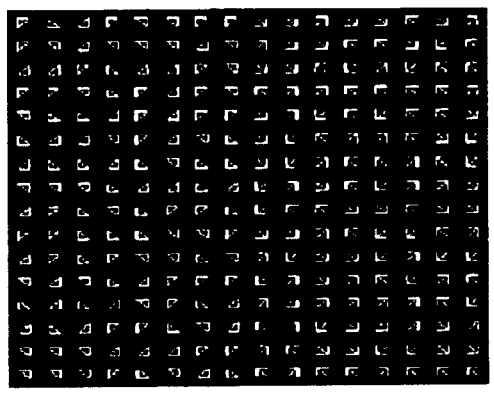
Figure 8B:
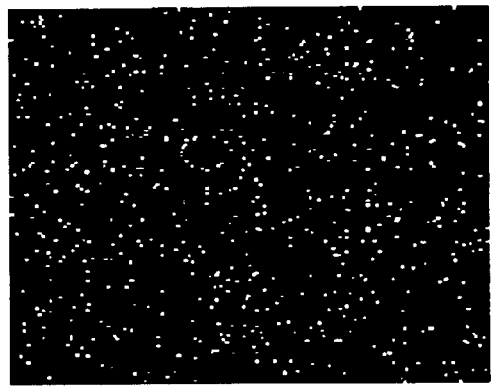
Figure 8C:
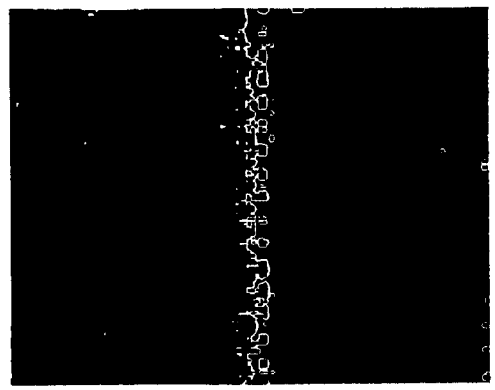

The image sequence on FIG. 8 illustrates the image segmentation according to the invention based on the example of artificial textures. FIG. 8a shows two artificial textures, of which the first texture in the left half of the image consists of triangles, and the second texture in the right corner of the image consists of arrows. The textures have the same second-order statistics, and can therefore not be distinguished between using local linear feature acquisitions (see B. Julesz in "Rev. Mod. Phys.", Vol. 63, 1991, p. 735). The white image points highlighted for the sake of clarity on FIG. 8b illustrate the reference points or image points with labels used for initializing the cluster procedure. These are 655 pixels selected completely at random. The share of reference points hence lies at 1% relative to the overall point number (these conditions were also used for the remaining examples). Finally, FIG. 8c shows that, despite the identical second-order statistics, reliable image segmentation can be achieved using the procedure according to the invention. 98.2% of the image points have been correctly classified.

Figure 9A:
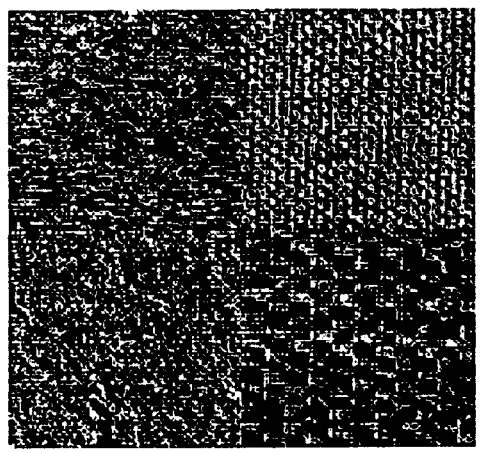
Figure 9B:
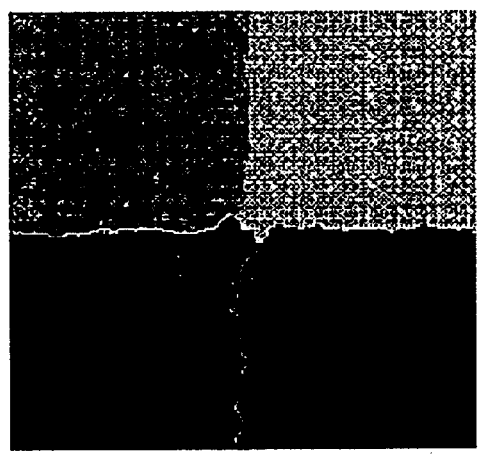
Figure 9C:
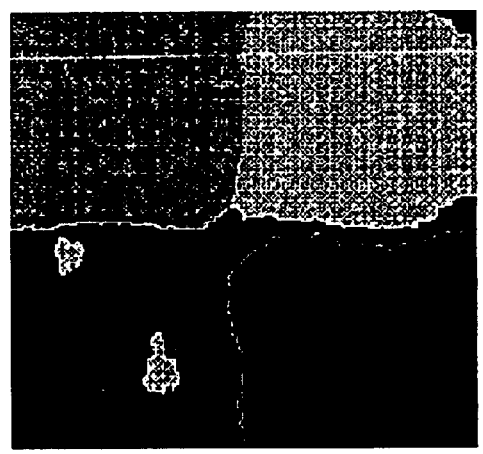

FIG. 9a shows another set of four natural Brodatz textures (D96, D55, D38 and D77). FIGS. 9b and 9c illustrate the different results when using various distance measures for texture classification. When using ellipsoidal metrics, 97.1% of the points are correctly classified according to FIG. 9b. By contrast, if only a Euclidian metric is used for texture classification, only 94.9% of the image points are correctly classified according to FIG. 9c. As a result, the segmentation result is worse in comparison to FIG. 9b, but still adequate for various applications.

If the texture image is now overlaid with noise, FIG. 10a results. The noise is an additive white Gaussian noise with a noise level corresponding to a predetermined standard deviation $\sigma_{noise}$. In the depiction according to FIG. 10a, $\sigma_{noise}=0.1·\Delta I$, wherein $\Delta I$ denotes the intensity range of the undisturbed image.

When using ellipsoidal metrics according to FIG. 10b, an acceptable segmentation result is still achieved for the grainy image, while the result is heavily skewed when using a Euclidian metric according to FIG. 10c. Given an increase in the noise percentage to $\sigma_{noise}=0.2·\Delta I$, there is a high stability in image segmentation, provided it is based on the ellipsoidal metrics (FIG. 10d). Image segmentation based on the Euclidian metric exhibits a further deterioration, however (FIG. 10e).

The noise effect visualized on FIG. 10 is also illustrated in the curve depiction according to FIG. 11. FIG. 11 shows the number of correctly classified image points (ccp) in percent as a function of the noise level $\sigma_{noise}$. The solid line corresponds to the segmentation result when using the ellipsoidal metrics, while the dashed line reflects the result obtained when using the Euclidian metric. The significantly higher stability of the image segmentation in the first case is visible.

The image examples highlight the following significant advantages to image segmentation according to the invention. First, it must be pointed out that all texture recognitions are based only on knowledge of the feature image (feature vectors). In image segmentation, the specific image point coordinates are not the critical factor, but only the properties of the feature vectors. The procedure is parameter-free relative to cluster allocation. This represents a significant difference In comparison to the parameters to be optimized in conventional texture classification procedures.

C) Segmentation Arrangement

The diagrammatically illustrated segmentation arrangement on FIG. 12 consists specifically of a measuring device 1, with which the point distribution to be segmented is acquired, a filtering device 2, which is designed to evaluate the measured point distribution according to the filtering functions explained above, and to this end comprises scanners, counters and means for acquiring or statistically processing scaling factors, an input device 3, which is used to enter information for the partial supervision of image segmentation, i.e., predetermined textures and the group of reference points with labels, a calculating device 4 for determining and evaluating distance measures for the texture features of all remaining points, and an output device 5 to display, temporarily store or relay texture segments. Additional components of a device according to the invention, e.g., a controller, are not shown. The filtering device 2 and calculating device 4 are preferably formed by a shared computer.

What is claimed is:

1. A method for segmenting a point distribution with numerous points into partial areas, which each exhibit specific structured elements comprising:

a) determining for each point ($\vec{p}_i$), a feature vector ($\vec{x}_i$) whose components are determined based on at least several scaling factors belonging to a respective point;

b) determining accompanying feature vectors ($\vec{p}_i^{\,1}$) for a predetermined number of reference points ($\vec{x}_i^{\,1}$) of the point distribution for which allocation to one of the structural elements is given, and texture classes each corresponding to the underlying structural elements are formed out of the feature vectors of the reference points;

c) determining the distance between the respective point and each of the texture classes for all remaining points ($\vec{p}_i''$) of the point distribution that are reference points based on a distance measure in the feature space, which fixed by the components on the feature vectors;

d) allocating each of the points ($\vec{p}_i''$) to a texture class for which a lowest distance was determined; and e) forming partial areas of segmentation out of respective reference points belonging to a texture class and the points allocated in step d).

2. The method according to claim 1, in which several isotropic and anisotropic sealing factors ($\alpha$) are determined as components of the feature vectors ($\vec{x}_i$).

3. The method according to claim 2, further comprising determining anisotropic scaling factors ascertained for a point in various coordinate systems rotated relative to each other.

4. The method according to claim 1, in which expected values of several scaling factors are determined as components of the feature vectors ($\vec{x}_i$).

5. The method according to claim 4, further comprising determining anisotropic scaling factors ascertained for a point in various coordinate systems rotated relative to each other.

6. The method according to claim 1, in which an ellipsoidal distance measure is used as a local distance measure in step c) for each texture class.

7. The method according to claim 1, in which Euclidian distance measure is used as a shared distance measure in step c) for all texture classes.

8. The method according to claim 1, further comprising displaying, temporarily storing and/or further processing segmented partial areas.

9. The method according to claim 8, further comprising quantitatively acquiring the size of the partial areas substantially simultaneously to displaying the segmented partial areas.

10. The method of according to claim 1, which processes images of medical or biological objects;

images of materials;

point distributions of complex static systems;

point distributions that reproduce system status of complex, dynamic systems; and time patterns for dynamic systems.

11. An image segmentation arrangement for segmenting a point distribution out of numerous points, with a measuring device for acquiring the point distribution, a filtering device for scanning and filtering the point distribution, an input device, a calculating device and an output device, wherein the filtering, input and calculating device execute a method according to claim 1.

* * * * *